UNITED STATES PATENT OFFICE.

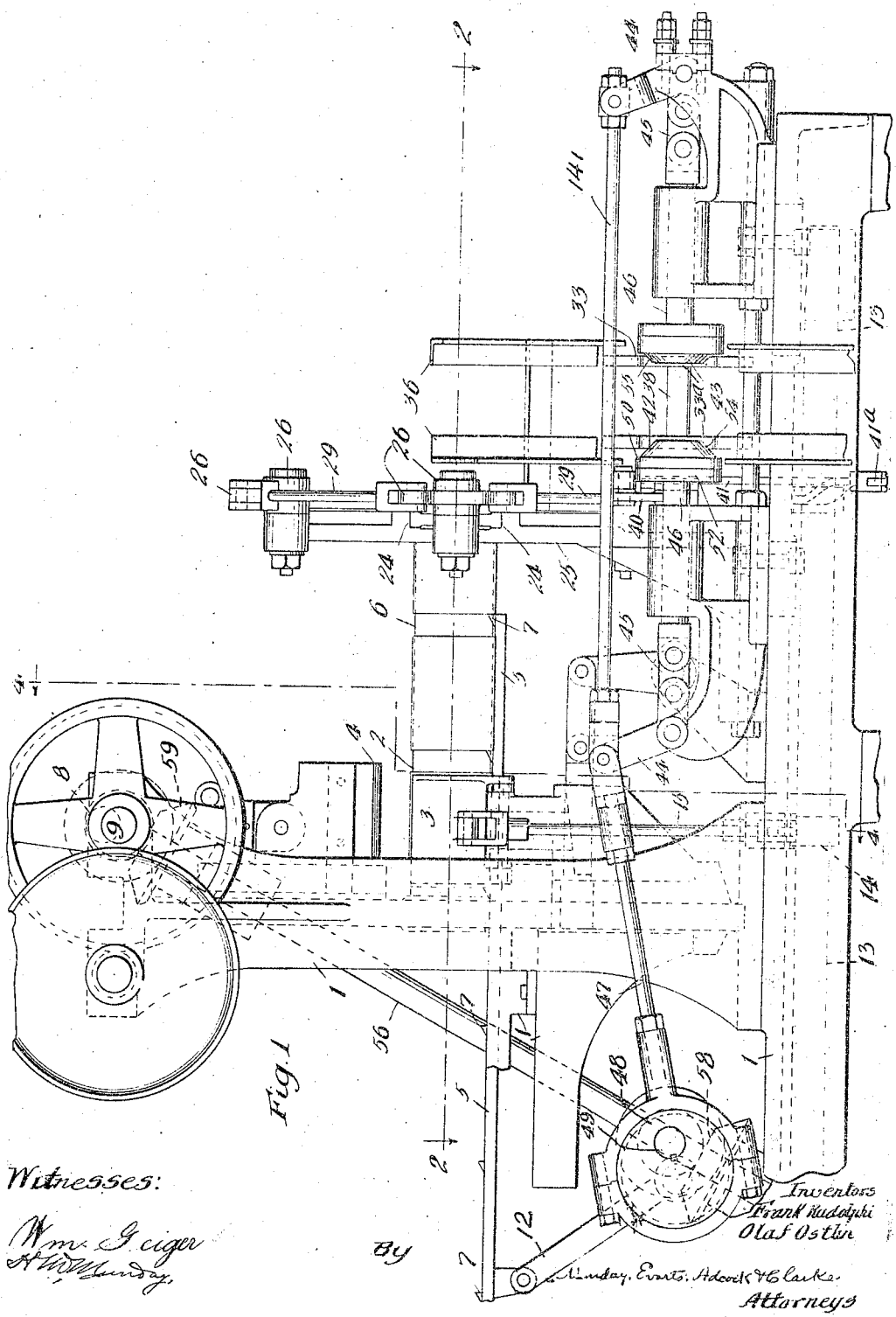

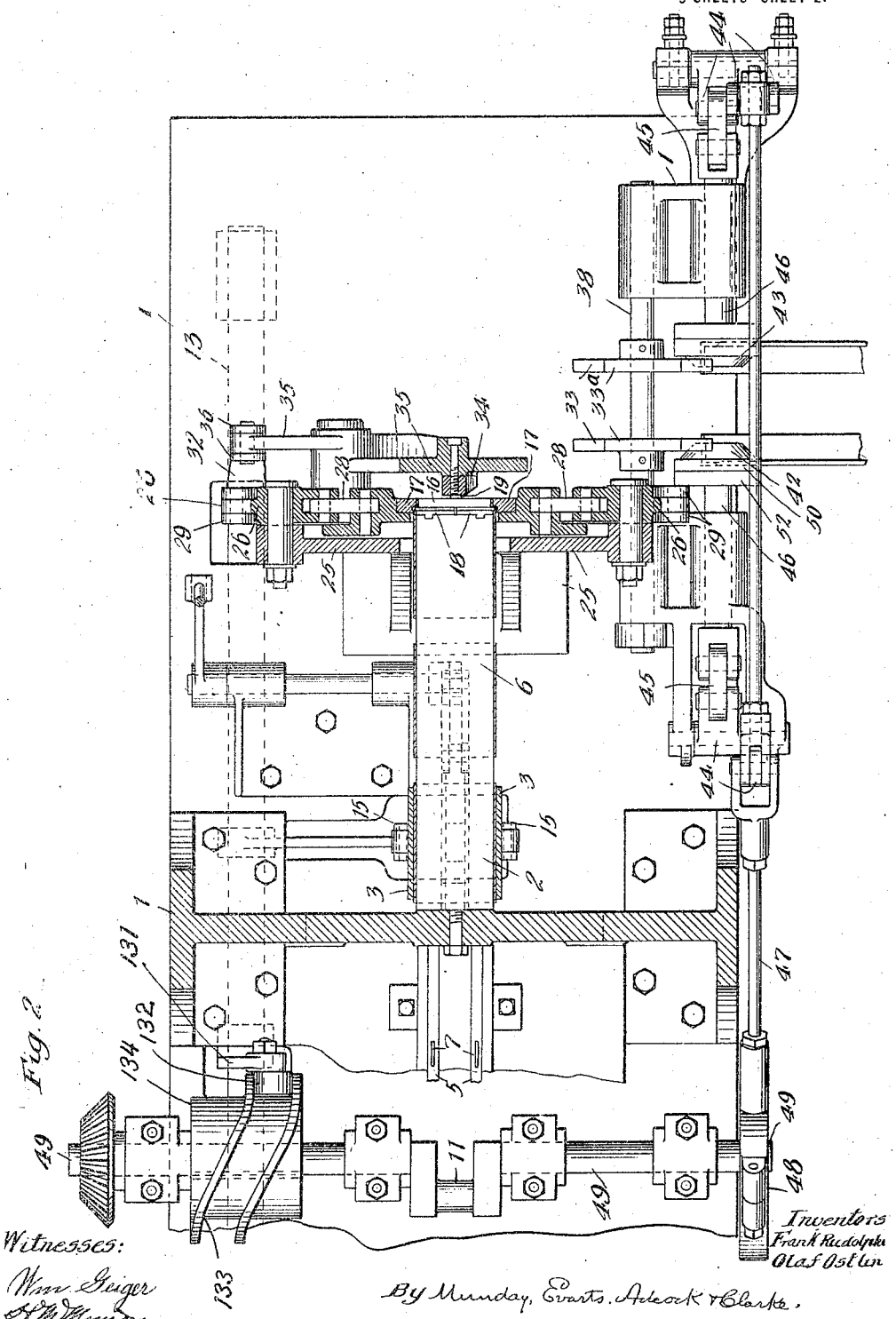

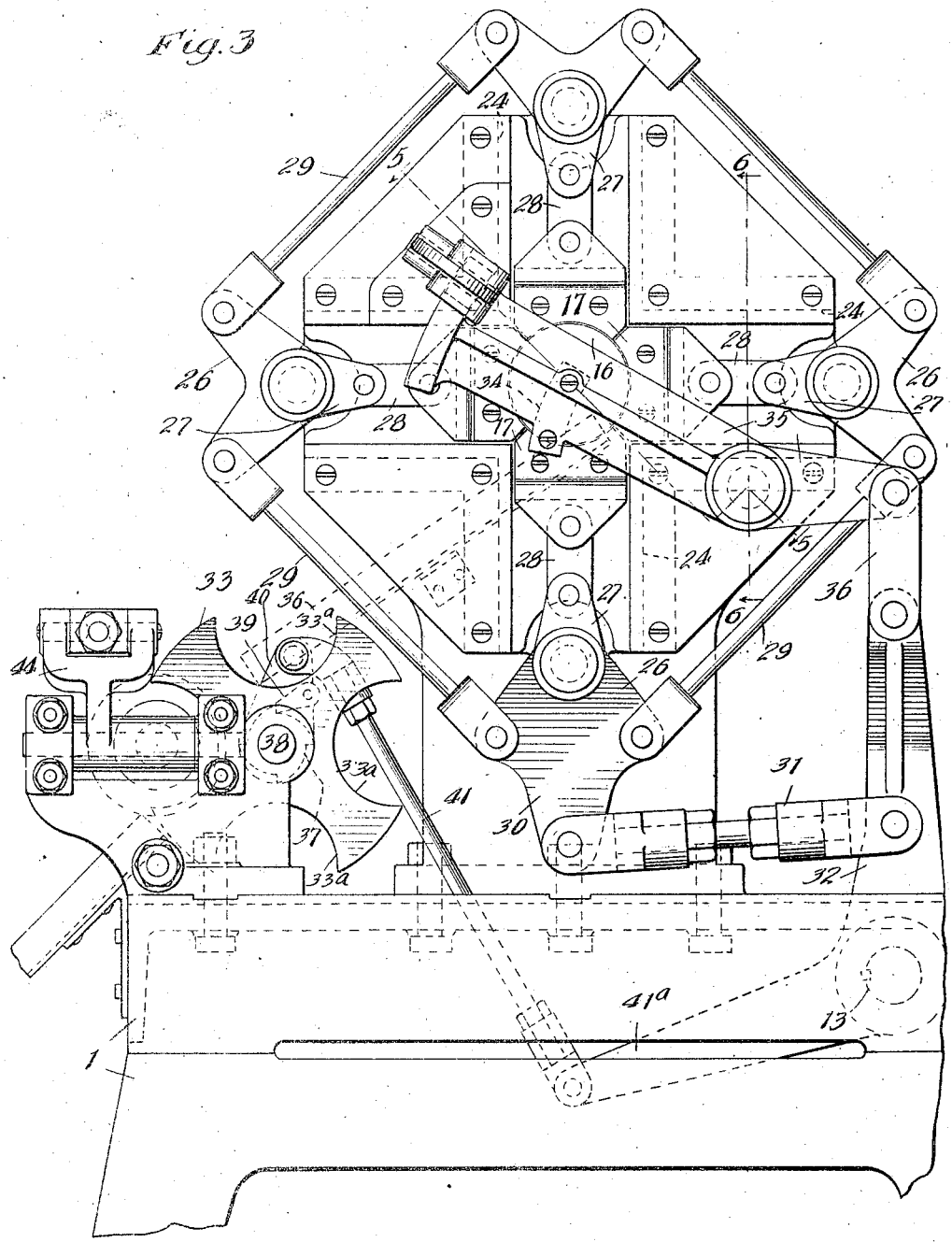

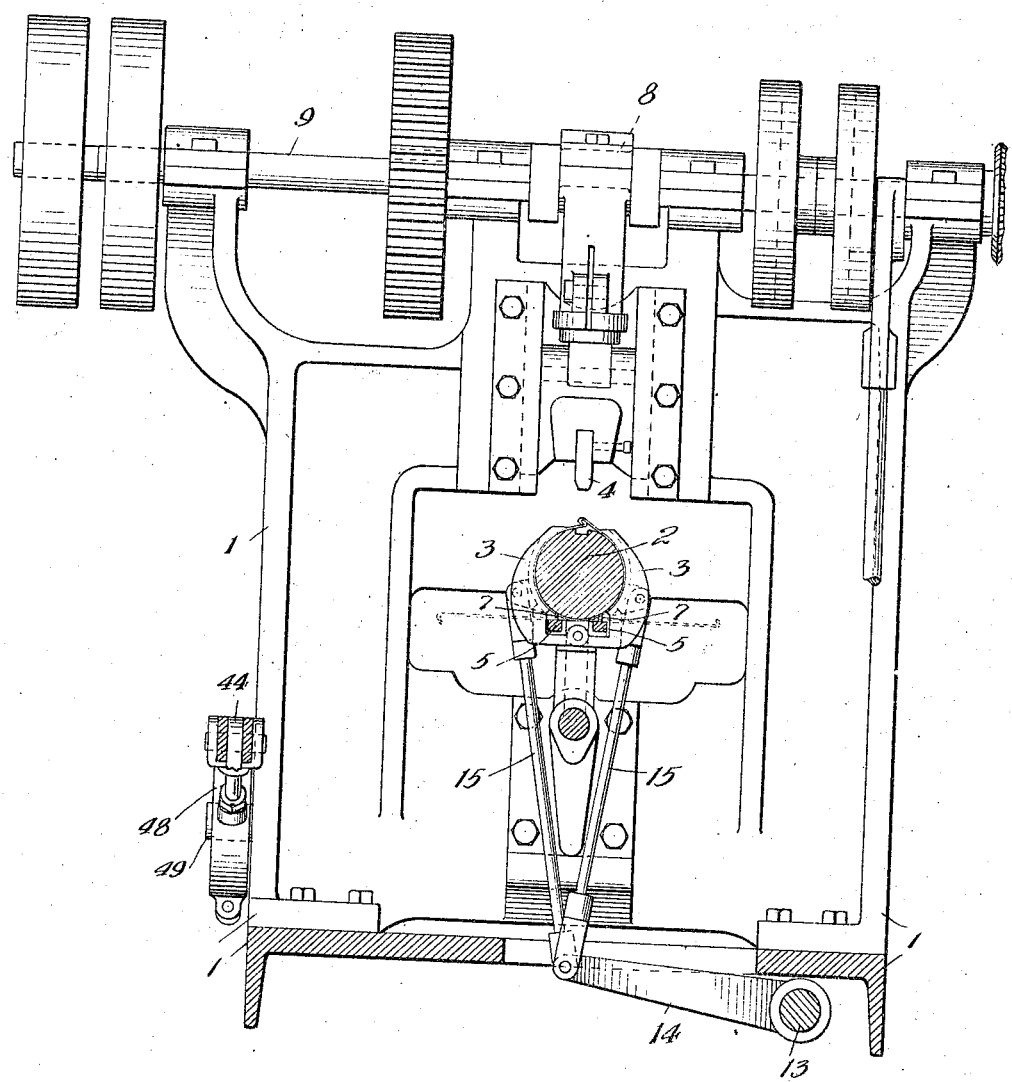

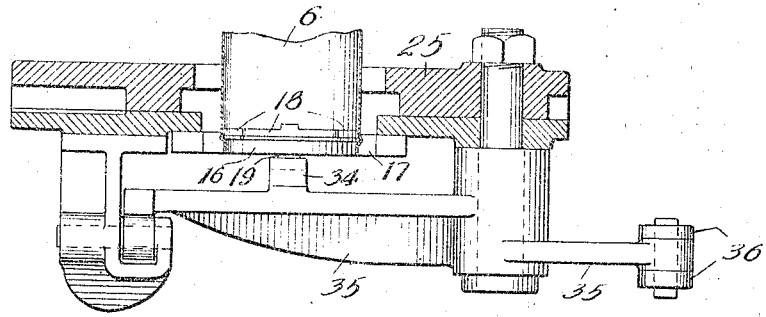
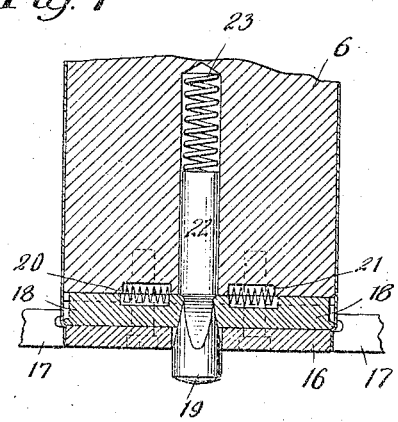
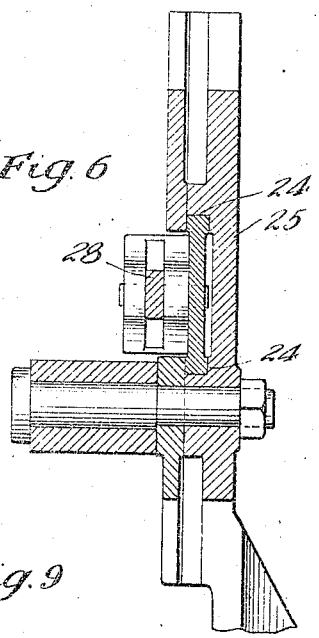
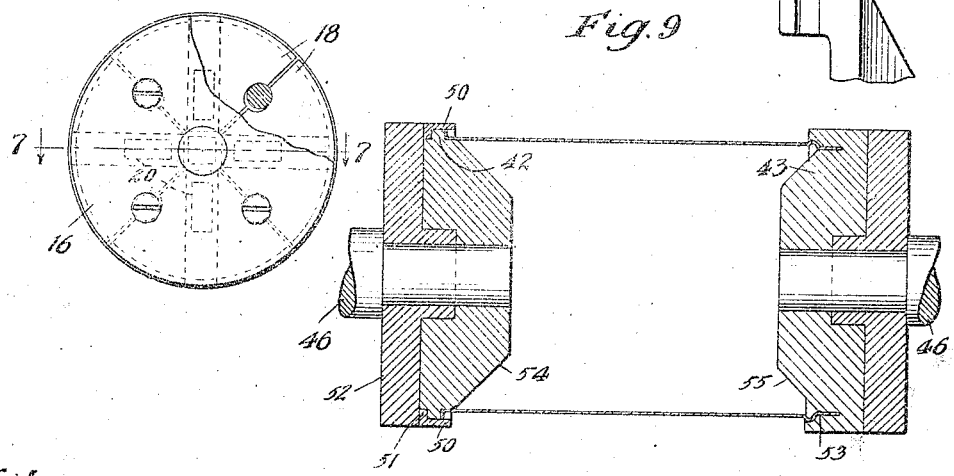

FRANK RUDOLPHI, OF NEW YORK, N. Y., AND OLAF OSTLIN, OF MAYWOOD, ILLINOIS, ASSIGNORS TO AMERICAN CAN COMPANY, OF NEW YORK, N. Y., A CORPORATION OF NEW JERSEY.

CAN-BODY-MAKING MACHINE.

1,227,077. Specification of Letters Patent. Patented May 22, 1917.

Application filed January 9, 1911. Serial No. 601,542.

*To all whom it may concern:*

Be it known that we, FRANK RUDOLPHI, a citizen of the United States, residing in New York, in the county of New York and State of New York, and OLAF OSTLIN, a citizen of the United States, residing at Maywood, in the county of Cook and State of Illinois, have invented a new and useful Improvement in Can-Body-Making Machines, of which the following is a specification.

Our invention relates to improvements in can body making machines.

The object of our invention is to provide an automatic can body making machine of a simple, efficient and durable construction by means of which necked-in, beaded and flanged can bodies may be rapidly and economically produced.

Our invention consists in the novel construction of parts and devices and in the novel combinations of parts and devices herein shown and described and more particularly specified in the claims.

The machine embodying our invention comprises in coöperative combination, a body former horn furnished with an extension for supporting the formed can body in position for operation thereon of the necking-in and beading dies or jaws, wings or folding devices for forming the body blank about the horn, a bumper for compressing the hooks or edge folds of the body blank into a seam, a plurality of radially reciprocating or opening and closing external necking-in dies or jaws, an internal necking-in die mounted on the end of the horn extension and coöperating with the radially reciprocating external necking-in dies, a plurality of opening and closing or radially reciprocating beading dies mounted on the end of the horn extension, a reciprocating conveyer for feeding the body blanks to the body former horn and advancing the formed can bodies along the horn extension to the necking-in and beading devices and finally discharging the necked-in and beaded can body from the horn extension, an intermittently moving can body carrier having a plurality of pockets to receive the necked-in and beaded can bodies as they are delivered from the body former horn and its extension, a reciprocating flanging die and a coöperating support for the opposite end of the can body for automatically flanging the can bodies as they are presented thereto one by one by said carrier.

In the accompanying drawing forming a part of this specification, Figure 1 is a side elevation of a can body making, necking-in, beading and flanging machine embodying our invention, only that portion of the body forming mechanism being shown to which our improvement relates. Fig. 2 is a horizontal section on line 2—2 of Fig. 1. Fig. 3 is an enlarged, detail, partial end elevation. Fig. 4 is an elevation partly in vertical section on line 4—4 of Fig. 1. Figs. 5 and 6 are enlarged detail sections on lines 5—5 and 6—6 respectively of Fig. 3. Fig. 7 is a detail sectional view of the horn extension on line 7—7 of Fig. 8. Fig. 8 is an end view of the horn extension, partially broken away and partly in vertical section. Fig. 9 is a detail vertical sectional view through the flanging die, and showing also the support for the opposite end of the can body which resists the thrust of the flanging die.

In the drawing, 1 represents the frame of the machine of any suitable form, adapted to give support or mounting to the other parts. 2 is the body former horn of the can body making mechanism, 3 the folding or forming wings by which the blank is wrapped around the horn, 4 the bumper and 5 the conveyer or reciprocating slide by which the body blanks are fed or advanced first to the edge folding or hook forming devices (not shown) of the body forming mechanism, and next to the body former horn 2 and folding wings 3, and by which the formed can bodies are further fed or advanced along the extension 6 of the body former horn to the necking-in and beading devices.

The reciprocating conveyer or feed slide 5 is provided with a plurality of feed fingers or pawls 7 for advancing the body blanks and can bodies by engagement with the rear edges thereof.

The bumper 4 is reciprocated as required by a crank 8 on an operating shaft 9 of the machine, and the conveyer or feed slide 5 is reciprocated as required from an operating shaft 49 of the machine through a suitable crank or device 11 and connecting rod 12. The folding or forming wings 3 are operated or opened and closed as required from a shaft 13 of the machine through a suitable crank arm 14 and connecting rods 15.

The shaft 13 is oscillated by means of a lever 131 having mounted thereon at its outer end a roller 132 engaging a cam or race 133 on the barrel cam 134 secured to the cross shaft 49.

All of the above mentioned parts are or may be of any suitable kind or construction now commonly in use and familiar and well known to those skilled in the art, and consequently need no further description.

The horn extension 6 may be integral with or in a separate piece from and secured to the end of the body former horn 2 as may be desired. This extension of the horn is made long enough to give the necessary room or space between the can body forming mechanism and the necking in and beading mechanism.

The body former horn extension 6 is provided at its outer end with an internal necking-in die 16 of slightly smaller diameter than the can body, the difference in diameter representing the extent to which the end of the can body is to be necked in by the co-operating external necking-in dies or jaws 17, which are preferably four in number and reciprocate radially in and out to effect the necking-in operation.

The horn extension 6 is further provided at its outer end with a plurality of movable or radially expansible beading dies 18, preferably four in number, and adapted to be expanded by a central wedge 19, the beading dies 18 being contracted by springs 20 seated in suitable pockets 21 in part formed in the end of the horn extension 6 and in part formed in the beading dies 18. The wedge 19 is a four faced one, the faces of the wedge corresponding to the number of the beading dies 18, and it is provided with a guide stem 22 against the inner end of which a spring 23 in the horn extension 6 bears to restore the wedge to its normal or outermost position. The expansible beading dies 18 are mounted between the outer end of the horn and the internal necking-in die 16.

The radially reciprocating necking-in dies 17 are mounted to slide in suitable guides 24 on the stationary frame member 25, and the same are simultaneously opened and closed or radially reciprocated to effect the necking-in operation by means of bent levers 26, having arms 27 which are connected by links 28 with the necking-in jaws or dies 17, the outer arms of the bent levers 26 being connected together by links 29, so that all the dies 17 are operated simultaneously. One of the bent levers 26 is furnished with a further arm 30, which is connected by an adjustable link 31 with the operating lever 32 on the rock shaft 13.

The wedge 19 which operates the internal beading dies 18 is operated as required to expand the beading dies by means of a cam 34 on a lever 35 which is connected by a link 36 with the necking-in die operating lever 32. The lever 35 is oscillated sufficiently so that the same will clear the can bodies as they are delivered from the horn. After the can body has been necked-in by operation of the necking-in dies 16, 17, and beaded by operation of the beading dies 18, it is discharged from the horn extension 6 by the conveyer or feed slide 5, pushing the next succeeding can body against the one that has just been necked-in and beaded. As the necked-in can body is discharged from the horn extension by the can body conveyer or feed slide 5, it is delivered to an intermittently moving can body carrier 33 having a plurality of semi-circular can body receiving pockets 33ᵃ by an intermediate can body delivery device 36, preferably a chute down which the can bodies may roll.

The can body carrier 33 rotates about an axis parallel to that of the body former horn and the axes of the can body receiving pockets 33ᵃ are also arranged parallel to the body former horn so that the can bodies as they are delivered from the horn may roll directly into the pockets of the carrier one by one. The can body carrier 33 is preferably intermittently rotated as required in proper time with the bumper 4, folders or body forming wings 3, external necking-in dies 17 and internal beading dies 18 by means of a ratchet 37 on the shaft 38 of the carrier and a pawl 39 and pawl lever 40 which is connected by a link 41 with an arm 41ᵃ on the necking-in die operating lever 32.

The intermittently moving can body carrier 33 serves to move the necked-in can body into registry with a flanging die 42 and its opposing support 43.

The flanging die 42 and its support 43 are mounted with their common axis parallel to the carrier shaft 38 and are adapted to be reciprocated to and from each other to engage the opposite ends of the can body supported in a pocket of the carrier 33 when the carrier 33 comes to rest after each intermittent movement. The flanging die 42 and support 43 are both preferably reciprocated as required by means of bent levers 44 connected by a rod 141, said lever 44 being connected by links 45 with the slides or stems 46 of the flanging die 42 and support 43. One of the levers 44 is connected by an adjustable link 47 with an eccentric 48 on the shaft 49.

The flanging die 42 is furnished with an annular stop shoulder or flange 50, preferably in a separate piece from the die 42 and which serves to limit the extent to which the flange may be turned on the can body by the flanging die at its inward stroke. The annular shoulder or stop flange 50 has a flange 51 for securing it in place on the die 42 by the die head 52. The support 43 for the opposite end of the can body has an annular groove or socket 53 corresponding to and adapted to receive the necked-in and beaded end of the can body. The flanging die 42 has a beveled or cone face 54 for guiding the die into the end of the can body and the support 43 has a similar cone or guide face 55 for a like purpose.

The shaft 49 is preferably driven from the shaft 9 through a connecting shaft 56, having bevel gears 58, 59, meshing with corresponding bevel gears on the shafts 49 and 9.

We claim:—

1. In a can body machine, the combination with a can body former horn having an extension, of a conveyer for moving the can bodies along said extension and a plurality of opening and closing external necking-in dies movable in a plane perpendicular to the axis of the horn extension, substantially as specified.

2. In a can body machine, the combination with a can body former horn having a stationary extension, of a conveyer for moving the can bodies along said extension and a plurality of external necking-in dies, means for positively opening and closing the same and a coöperating internal necking-in die on the end of said horn extension, substantially as specified.

3. In a can body machine, the combination with a can body former horn having an extension, of a conveyer for moving the can bodies along said extension, a plurality of opening and closing external necking-in dies, a coöperating internal necking-in die on the end of said horn extension, and a plurality of expanding beading dies mounted on the end of said horn extension, substantially as specified.

4. In a can body machine, the combination with a can body former horn having an extension, of a conveyer for moving the can bodies along said extension, a plurality of opening and closing external necking-in dies and a plurality of movable beading dies, substantially as specified.

5. In a can body making machine, the combination with a body former horn having a stationary extension, of an internal necking-in die on the end of said horn extension and a plurality of opening and closing necking-in dies or jaws, substantially as specified.

6. In a can body making machine, the combination with a body former horn having an extension, of an internal necking-in die on the end of said horn extension, a plurality of opening and closing necking-in dies or jaws and beading devices, substantially as specified.

7. In a can body making machine, the combination with a body former horn having an extension, of an internal necking-in die on the end of said horn extension, a plurality of opening and closing necking-in dies or jaws movable radially relatively to the internal necking-in die, a carrier having can body receiving pockets and a device for delivering the can bodies from said horn extension to said carrier, substantially as specified.

8. In a can body making machine, the combination with a body former horn having a stationary extension, of a plurality of beading dies mounted on said extension adapted to form an outwardly extending circular bead on the can body, substantially as specified.

9. The combination with a stationary horizontally disposed can body supporting horn along which the cans may be conveyed, of a plurality of opening and closing external necking-in dies, substantially as specified.

10. The combination with a horizontally disposed can body supporting horn along which the cans may be conveyed, of a plurality of opening and closing necking-in dies movable in a single plane, and a stationary internal necking-in die on said horn, substantially as specified.

11. The combination with a horizontally disposed can body supporting horn, of a plurality of opening and closing necking-in dies, an internal necking-in die on said horn and a plurality of opening and closing beading dies on said horn, substantially as specified.

12. In a machine of the class described, in combination, a horn having a stationary extension, and can body necking-in mechanism, the necking-in mechanism being so arranged that the can bodies are necked in while on the horn extension and prevented from rotation thereon.

13. In a machine of the class described, in combination, a horn having an extension, can body necking-in mechanism and can body beading devices, the necking-in mechanism and the beading devices being so arranged that the necking-in and beading of the cans are performed while the can body is on the horn extension.

14. In a machine of the class described, in combination, a horn having an extension, can body necking-in mechanism and can body beading mechanism, the necking-in and beading mechanisms being so arranged that the can bodies are necked in and beaded while on the horn extension.

15. The combination with can body-forming mechanism comprising a horn, of necking in mechanism comprising an extension of said horn formed with a reduced necking mandrel for shaping the interior of the neck, and exterior jaws adapted to close in upon the body and shape its neck against said mandrel.

16. Mechanism for shaping can bodies comprising a mandrel, means for feeding successive can bodies along said mandrel, external jaws movable inwardly to embrace the can body, said mandrel having segmental dies movable in the same plane as said jaws and movable outwardly to squeeze the can body against said jaws, and an expander within said dies having inclined faces engaging them and movable to expand said dies.

17. Mechanism for shaping can bodies comprising external jaws movable inwardly to embrace the can body, a mandrel having segmental dies in the same plane as said jaws, means for subsequently moving said segmental dies outwardly to squeeze the can body against said jaws, and means for feeding successive can bodies along said mandrel.

18. Mechanism for shaping can bodies comprising external jaws movable inwardly to embrace the can body, said jaws formed with coinciding beading grooves, a mandrel having segmental dies in the same plane as said jaws, said dies having external beading ribs coinciding with said grooves in the jaws, means for moving said dies outwardly subsequent to the inward movement of the jaws to squeeze the can body against said jaws, and means for feeding successive can bodies along said mandrel.

FRANK RUDOLPHI.

Witnesses:
   Leonard Michael,
   Rue Breckenridge.

OLAF OSTLIN.

Witnesses:
   Edmund Adcock,
   Pearl Abrams.